United States Patent
Osborne et al.

(10) Patent No.: US 7,811,374 B2
(45) Date of Patent: Oct. 12, 2010

(54) COLORED COATING AND FORMULATION

(75) Inventors: Joseph H. Osborne, Tacoma, WA (US); Ronald R. Stephenson, Auburn, WA (US); Kenneth A. Krienke, Seattle, WA (US); Larry K. Olli, Seattle, WA (US)

(73) Assignee: The Boeing Company, Chicago, IL (US)

( * ) Notice: Subject to any disclaimer, the term of this patent is extended or adjusted under 35 U.S.C. 154(b) by 1443 days.

(21) Appl. No.: 11/213,707

(22) Filed: Aug. 30, 2005

(65) Prior Publication Data

US 2007/0044704 A1    Mar. 1, 2007

(51) Int. Cl.
*C08K 3/00* (2006.01)
*C23C 16/40* (2006.01)
*G01D 13/22* (2006.01)
*C09K 11/02* (2006.01)
*C09K 11/06* (2006.01)

(52) U.S. Cl. ............... 106/287.19; 106/450; 116/206; 252/301.16; 252/301.36

(58) Field of Classification Search ............ 106/287.19, 106/450; 116/206; 252/301.36, 301.35, 252/301.16; 427/8, 157; 428/472, 328
See application file for complete search history.

(56) References Cited

U.S. PATENT DOCUMENTS

| | | | |
|---|---|---|---|
| 5,766,680 A * | 6/1998 | Schmidt et al. | 427/226 |
| 6,605,365 B1 | 8/2003 | Krienke et al. | |
| 2003/0114540 A1 * | 6/2003 | Mager | 516/99 |
| 2004/0099183 A1 | 5/2004 | Wire et al. | |

OTHER PUBLICATIONS

Craig Matzdorf; "Non-Chromate Aluminum Pretreatments, ESTCP, Phase I Report, Project #PP0025," Aug. 2003, Naval Air Systems Command (NAVAIR), Patuxent River, MD. (http://www.jgpp.com/projects/pretreatments/documents/phase_i_.pdf).

Bill Nickerson; "Non-Chromate Aluminum Pretreatments, ESTCP, Phase II Interim Report, Project #PP0025," Sep. 2004 (cleared for open publication Mar. 11, 2005), Naval Air Systems Command (NAVAIR), Patuxent River, MD.

* cited by examiner

*Primary Examiner*—Anthony J Green
*Assistant Examiner*—Pegah Parvini

(57) ABSTRACT

A composition for coating a surface includes a carrier and an indicator distributed throughout the carrier. The indicator is configured to modify an appearance of the coating. The indicator facilitates determining a thickness of the coating in response to the appearance of the coating.

13 Claims, 2 Drawing Sheets

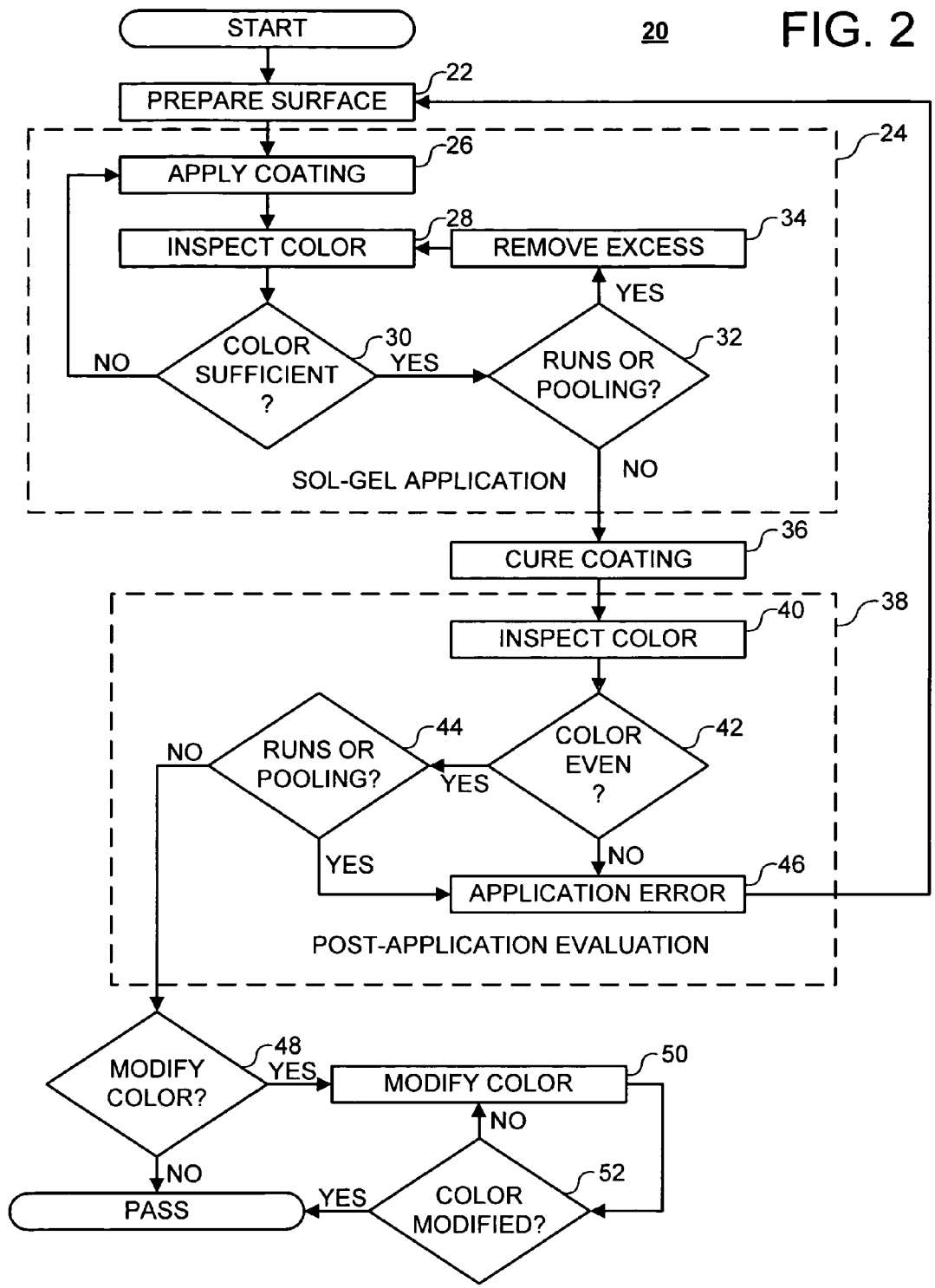

ically evenly throughout. The indicator colors the coating. The color of the coated surface is determined. The thickness of the coating is determined in response to the color. The color is removed from the coating.

COLORED COATING AND FORMULATION

The invention was made with Government support awarded by the United States Air Force whom has certain rights in this invention.

FIELD OF THE INVENTION

The present invention generally relates to a surface coating and formulation. More particularly, the present invention pertains to a colored solution for coating a surface and formulation thereof.

BACKGROUND OF THE INVENTION

In various manufacturing and construction industries, items are produced that benefit from a surface coating or primer. Typically, these coatings provide some protection for the underlying surface or facilitate the adhesion of subsequent coatings such as paint. Metal or reactive surfaces, are typically coated or chemically altered to reduce reactivity and thereby reduce corrosion or oxidation. For example, parts containing aluminum or titanium often undergo a chromate conversion coating process such as Alodine™ treatment to reduce corrosion. Unfortunately, these treatments tend to generate waste that is expensive to process. Thus, for relatively large metal items, such as airplanes, conversion coatings may add considerable cost to the item.

Accordingly, it is desirable to provide a coating capable of overcoming the disadvantages described herein at least to some extent.

SUMMARY OF THE INVENTION

The foregoing needs are met, to a great extent, by the present invention, wherein in one respect a surface coating and formulation thereof is provided.

An embodiment of the present invention pertains to a composition for coating a surface. The composition includes a carrier and an indicator distributed throughout the carrier. The indicator is configured to modify an appearance of the coating. The indicator facilitates determining a thickness of the coating in response to the appearance of the coating and the indicator is controllable to demodify the appearance of the coating.

Another embodiment of the present invention relates to a composition for coating a surface. The composition includes a carrier and a colorant. The carrier includes an alkoxyzirconium aqueous sol, an organosilane coupling agent, and a catalyst. The alkoxyzirconium aqueous sol includes (R—O)$_4$—Zr, where R is C$_2$-C$_5$ aliphatic and the zirconium is configured to chemically bond the surface. The catalyst includes an effective amount of acetic acid. The colorant is distributed throughout the carrier and modifies an appearance of the coating.

Yet another embodiment of the present invention pertains to a method of evaluating a coating applied to a surface. In this method, the coating having an indicator is applied to the surface and it is determined if the indicator is present on the surface at a substantially uniform concentration. The coating includes a conversion gel to chemically bind the surface and the indicator. The indicator modifies an appearance of the coating.

Yet another embodiment of the present invention pertains to a method of determining a thickness of a substantially clear coating on a surface. In this method, a coating is applied to the surface. The coating included an indicator distributed substantially evenly throughout. The indicator colors the coating. The color of the coated surface is determined. The thickness of the coating is determined in response to the color. The color is removed from the coating.

Yet another embodiment of the present invention pertains to an apparatus for evaluating a coating applied to a surface. The apparatus includes a means for applying the coating to the surface, an indicating means, and a means for determining whether the indicating means is present on the surface at a substantially uniform concentration. The coating includes a conversion sol gel to chemically bind the surface and the indicating means substantially evenly distributed throughout the coating. The indicating means modifies an appearance of the coating.

Yet another embodiment of the present invention pertains to an apparatus for determining a thickness of a substantially clear coating on a surface. The apparatus includes a means for applying a coating to the surface, means for determining a color of the coated surface, means for determining the thickness of the coating in response to the color, and means for removing the color from the coating. The coating includes an indicating means substantially evenly distributed throughout the coating. The indicating means colors the coating.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 2 is a flow diagram illustrating steps that are followed in accordance with an embodiment of the invention.

DETAILED DESCRIPTION

Figure 1:
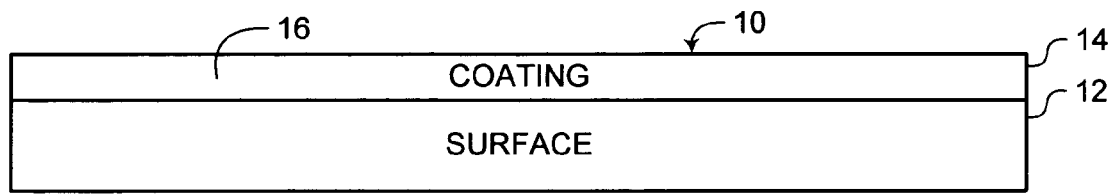
FIG. 1 is a block diagram of a coated surface in accordance with an embodiment of the invention.

The present invention provides a surface coating and formulation thereof that includes an indicator or colorant. In an example of a preferred embodiment, the coating chemically bonds to a surface and provides a protective layer and/or an adhesive layer upon which subsequent coatings adhere. A description of such coatings are to be found in U.S. Pat. Nos. 5,849,110; 5,869,141; 5,958,578; and 6,605,365, respectively titled: SOL-COATING OF METALS; SURFACE PRETREATMENT FOR COATING OF METALS; HYBRID LAMINATE HAVING IMPROVED METAL-TO-RESIN ADHESION; and PIGMENTED ALKOXYZIRCONIUM SOL, the disclosures of each of which is incorporated herein by reference in their entirety.

Preferred embodiments of the invention will now be described with reference to the drawing figures, in which like reference numerals refer to like parts throughout. As shown in FIG. 1, a coated surface 10 includes a surface 12 and a coating 14. The surface 12 includes any suitable material and item. General examples of suitable materials include, at least, those materials classified as electron acceptors and/or electron donors. More particularly, suitable materials include metals, plastics, resins, and the like. Specifically, aluminum and aluminum alloys, titanium and titanium alloys, and the like are suitable for use in various embodiments of the invention. Examples of suitable items generally include manufactured parts and goods. More particularly, airplanes, spacecraft, cars, boats, golf clubs, parts for these and other items, and the like are suitable for use in various embodiments of the invention. The coating 14 includes any suitable formulation, solution, or composition operable to form a coating on a surface. More particularly, the coating 14 includes clear, transparent, or translucent coatings. For example, Boegel EPII produces a high performance conversion coating that is a viable replacement for chromate conversion coatings and that lessen the environmental impact of painting operations. However, the Boegel EPII and other such coating are difficult to detect visually because they are essentially clear and do not substantially alter the appearance of the surface. As such, generating consistent applications and processing quality assurance inspections are difficult. By including an indicator 16, the conversion coating is visually detectable during and/or after application.

suitable dyes include those that remain suspended in solution. Particular examples of suitable dyes that are visible under white light include: Basic Blue 41, Direct Red 81, Fluorescent Yellow AA225, Methylene Blue, and the like. Particular examples of suitable dyes visible under ultraviolet (UV) light include: Pyranine dye; Basic Red 1 (rhodamine 6G); L-142; L-174; L-182; L-187; L-212; and the like. These and other suitable dyes that are visible under white light and/or UV light are available at: Sigma-Aldrich, Milwaukee, Wis., USA; VWR Scientific Products, West Chester, Pa., USA; Keystone Aniline Corporation, Chicago, Ill., USA; and Beaver Luminescers, Newton, Mass., USA.

In another embodiment, the indicator 16 includes a colorant chemically tethered or bound via hydrogen bonds, covalent bonds and the like, to a constituent of the coating 14. For example, by reacting hydroxyl or amine terminated colorant compounds with an isocyanate terminated alkoxysilane, the colorant may be substantially immobilized within the coating 14. It is an advantage of this embodiment that the tendency of the colorant to migrate out of the coating 14 is reduced. It is another advantage of this embodiment that relatively large and/or insoluble molecules may be tethered and substantially prevented from precipitating or otherwise coming out of solution. In particular, Lenhart, et al., (J. L. Lenhart, J. H. van Zanten, J. P. Dunkers, C. G. Zimba, C. A. James, S. K. Pollack, R. S. Pamas; "Immobilizing a Fluorescent Dye Offers Potential to Investigate the Glass/Resin Interface," *J. Colloid Interface Science*, 221 (2000): 75) have synthesized a material that features a fluorescent moiety attached to a silicon alkoxide group. In the following example, hydroxy-methylaminonitrostilbene (HMANS) reacts with isocyanatopropyltriethoxysilane (IPS) to produce the DMANS/silane coupling agent (DMSCA).

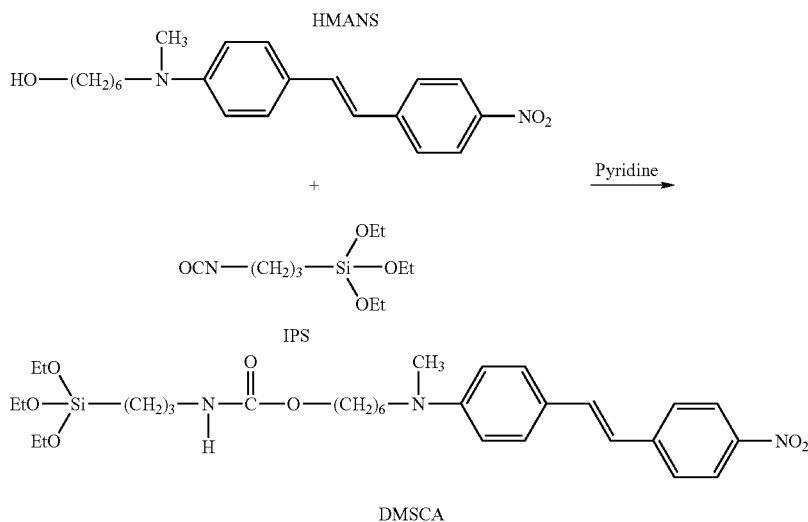

In various embodiments, the indicator 16 is: 1) visible essentially always; 2) visible for a predetermined time period; 3) substantially transparent until induced to become visible; 4) visible until induced to become essentially transparent; and/or 4) controlled to become visible and essentially transparent.

In an embodiment, any suitable dye is included as indicator 16 in a formulation for the conversion coating. In general, In a similar example, Dispersion Red 19 is reacted with 3-isocyanatopropyl-triethoxysilane over a range of times and temperatures and with a variety of solvents (chloroform, dioxane, tetrahydrofuran (THF)). In one such reaction method, dibutyl tin dilaurate is added to THF solvent and results in complete reaction of the isocyanate reactant overnight as monitored by the disappearance of the isocyanate peak (2230 cm$^{-1}$). The reaction product is isolated by evaporation. The product is dissolved in ethanol and filtered to remove some darker insoluble material. The ethanol is evaporated and the resulting product is a dark red pasty solid.

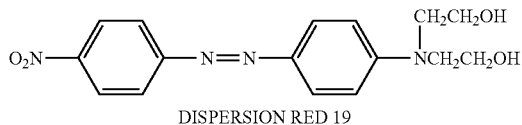

DISPERSION RED 19

The adduct is then dissolved in 6 ml of ethanol and diluted with 6 ml of deionized (DI) water prior to adding drop wise to 100 ml of Boegel EPII with stirring. Aluminum substrates are coated with the colored coating by drench coating the panels with a spray application, for example. The dried coating exhibits a pale red hue. Doubling the concentration of the dye adduct to 0.06 wt % does not appreciably increase the intensity of the red color on coated panels. Following room temperature curing for 72 hours, the coated panels are partially immersed in 120° F. (48.89° C.) DI water for 24 hours. A very slight loss of color is noted in the coatings.

The concentration of the Dispersion Red 19 dye adduct is then increased to 0.15% and 0.3 wt % of the dyed Boegel EPII mixture. The resulting coating mixture is an intense red-orange suspension. The resulting dyed Boegel EPII mixture sprayed uniformly on the aluminum panels with flood coating and after room temperature drying produces a coating with a reddish color. The coating from the 0.3 wt % mixture is visually only slightly more intense than the 0.15 wt % mix. Subsequent evaluation of different dye adducts is carried out at the 0.15 wt % level for comparison.

In addition, other suitable compounds for use as covalently linked indicators 16 include at least those with —OH or —NH$_2$ groups. Particular examples of dye compounds suitable for use as covalently linked indicators 16 due to the —OH or —NH$_2$ groups on the indicator 16 molecules include:

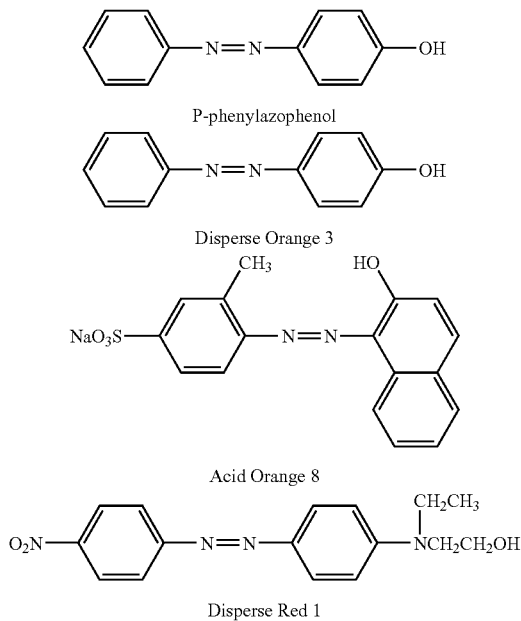

P-phenylazophenol

Disperse Orange 3

Acid Orange 8

Disperse Red 1

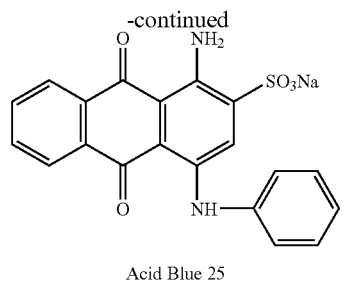

Acid Blue 25

As a general procedure, each dye is dissolved in THF at ~10 wt % concentration and reacts with the isocyanate terminated alkoxysilane at a 1:1 molar ratio. Dibutyl tin dilaurate, is added as a catalyst and the reaction is heated at 60° C. overnight. Disappearance of the isocyanate absorption in the infra red (IR) is interpreted as complete reaction. The dye adduct is isolated by removing the THF under vacuum, dissolving the residue in ethanol, filtering and removing the ethanol under vacuum. The solid product is considered to be the dye adduct and is used to color the coating 14.

In a specific example, Acid Blue 25 dye is incorporated into the coating 14. Acid Blue 25 has a —NH$_2$ functionality as well as containing the sodium salt of a sulfonic acid group. The dye is soluble in THF and water. The dye comes from the supplier as only 45% dye so filtration of THF solutions is carried out to remove the non-dye components. The dye adduct is soluble in ethanol and produces a nice uniform intense blue coating 14. The coated aluminum panel is significantly blue.

FIG. 2 is a flow diagram of a method 20 according to an embodiment of the invention. In general, the method 20 includes an optional surface preparation step 22, coating application step 24, curing step 26, evaluation step 28, and an optional color removal step 30.

At step 22, the surface 12 is optionally prepared for coating. If performed, the surfacing preparation may include one or more of cleaning, degreasing, abrading, acid etching, and the like. Depending upon the various manufacturing procedures performed to generate the surface, preparation of the surface 12 may not be required. If the surface 12 includes oils or other such contaminants, sufficient surface preparation is performed to remove the contaminants. For example, the surface 12 may be washed with a detergent to remove any oils present. The surface 12 may further be evaluated prior to coating. For example, a layer of water may be applied to the surface. If the surface 12 is determined to be "water break free," it may be determined that the surface 12 is ready for application of the coating 14. If the surface 12 includes coatings such as paint and the like, the coatings may be chemically and/or mechanically abraded until the surface 12 is exposed. It is an advantage of various embodiments of the invention that some oxidation may be present on the surface. Conventional coatings such as Alodine™, for example, require oxidation-free surfaces and thus require acid etching or other such treatments to remove all oxidation. It is another advantage of various embodiments that the surface 12 may be oxidized or anodized prior to application and this oxidation or anodized coating will not adversely effect subsequent application steps of the present invention.

At step 24, the coating 14 is applied to the surface 12. In an embodiment, the coating 14 with the included indicator 16 is applied to the surface 12. For example, the surface 12 is dipped in, drenched, or sprayed with the coating 14. More generally, any suitable coating 14 that includes the indicator 16 may benefit from various embodiments of the invention. More particularly, any clear, transparent, or translucent coating 14 may be formulated to include the indicator 16. Particular examples of steps performed during the application step 24 are provided herein with respect to steps 32 to 38.

At step 26, the coating 14 is cured. Curing of the coating 14 may be performed in any suitable manner. In various embodiments, curing is accomplished by allowing the coating 14 to air dry for a predetermined amount of time and/or until a predetermined surface characteristic is achieved such as, the coated surface 10 is dry to the touch, or the like.

At step 28, the coating 14 is optionally evaluated. In various embodiments, the coating 14 is not evaluated following curing, but rather, at the time of application. Alternatively, a post-application inspection is performed to verify appropriate application of the coating 14. Particular examples of steps performed during the optional evaluation step 28 are provided herein with respect to steps 42 to 48.

At step 30, the coating 14 is optionally "demodified" or returned to an essentially clear state. In general, if performed, the color is removed from the coating 14 by chemically altering the indicator 16 to reduce its visibility or by diffusing the indicator 16 from the coating 14. Particular examples of steps performed during the color removal step 30 are provided herein with respect to steps 50 to 54.

At step 32, the coating 14 is applied to the surface 12. In an embodiment, the coating 14 with the included indicator 16 is applied to the surface 12. For example, the surface 12 is dipped in, drenched, brushed, rolled, or sprayed with the coating 14. In a particular example, a user or operator sprays the coating 14 on the surface 12 with a suitable spray gun. Suitable examples of spray guns include high volume low pressure (HVLP) systems, high pressure low volume (HPLV) systems, electrostatic systems, and the like. In another example, a robotically controlled applicator nozzle is controlled to apply the coating 14 to the surface 12.

At step 34 the indicator 16 is inspected. For example, the user observes the color of the surface 12. In an embodiment, the indicator 16 is controlled to generate the visible color. For example, a dye configured to fluoresce in response to exposure to UV light may be utilized as the indicator 16 is included in the coating 14 and is exposed to a suitable wavelength of electromagnetic radiation to fluoresce at a visible wavelength. In other embodiments, the indicator 16 is visible in other wavelengths of light such as white light.

At step 36, it is determined if a sufficient amount of the indicator 16 is present. In an embodiment, the color or intensity of color is dependent upon a thickness of the applied coating 14. Thus, based on the color or intensity of color, the thickness of the coating 14 may be determined. It is an advantage of various embodiments that the thickness of any suitable coating 14 may be determined. Examples of suitable coatings include any otherwise transparent or translucent coating such as polyurethane, varnish, shellac, and the like. In response to one or more area being essentially devoid of the indicator 16 or below a predetermined color or color intensity, it may be determined that an insufficient amount of the indicator 16 is present and, therefore, more of the coating 14 is applied at step 32. In response to the color or intensity of color being at a predetermined sufficient color level on the surface 12 and/or the sufficient color being substantially evenly distributed upon the surface 12, it is determined if an excess of the indicator 16 is present at step 38.

At step 38, it is determined if an excess of the indicator 16 is present upon the surface 12. For example, the coated surface 10 is inspected for runs and/or pooling of the indicator 16. Specifically, relatively low points, creases, or other such surface characteristics are inspected. In response to an excess of the indicator 16 being present upon the surface 12, the excess is removed at step 40. In response to determining that an excess of the indicator 16 is not present upon the surface 12, the coating 14 is cured at step 26.

At step 40, excess coating 14 is removed. For example, a squeegee or absorbent cloth is utilized to remove any excess coating 14. In another example, a stream of air from an air gun or air knife is utilized to remove any excess coating 14.

At step 42, the indicator 16 is inspected. For example, the user observes the color of the surface 12. In an embodiment, the indicator 16 is controlled to generate the visible color. For example, a dye configured to fluoresce in response to exposure to UV light may be utilized as the indicator 16 is included in the coating 14 and is exposed to a suitable wavelength of electromagnetic radiation to fluoresce at a visible wavelength. In other embodiments, the indicator 16 is visible in other wavelengths of light such as white light.

At step 44, it is determined if the indicator 16 is present on the surface in a substantially even coating 14 and/or that sufficient amounts of the indicator 16 is present. In response to one or more area being essentially devoid of the indicator 16 or below a predetermined color or color intensity, it may be determined that an application error has occurred. In response to the color or intensity of color being at a predetermined sufficient color level on the surface and/or the sufficient color being substantially evenly distributed upon the surface, it is determined if an excess of the indicator 16 is present at step 46.

At step 46, it is determined if an excess of the indicator 16 is present upon the surface 12. For example, the coated surface 10 is inspected for runs and/or pooling of the indicator 16. Specifically, relatively low points, creases, or other such surface characteristics are inspected. In response to an excess of the indicator 16 being present upon the surface 12, it may be determined that an application error has occurred. In response to determining that an excess of the indicator 16 is not present upon the surface 12, it is determined if any color generated by the indicator 16 is to be removed at step 50.

At step 48, in response to determining an application error has occurred, the surface 12 is optionally prepared at step 22.

At step 50, it is determined if any color generated by the indicator 16 is to be modified. For example, if the product is intended to have a clear, transparent, or translucent coating, any color generated by the indicator 16 may be removed. In another example, color generated by the indicator 16 may be altered to a different color, such as, for example, a less visible color. In response to a determination that the color is to be modified, the color is modified at step 52. In response to a determination that any color present is acceptable, the coated surface 10 receives a passing evaluation and may be advanced to any further manufacturing step or the like. For example, if the colorant is made visible in response to UV illumination but is otherwise essentially clear, it may be determined that the indicator 16 may remain, as is, in the coating 14. In another example, if it is determined that the colorant will be covered by an opaque coating such as paint or that the colorant is aesthetically acceptable, it may be determined that the indicator 16 may remain, as is, in the coating 14.

At step 52, any color present is modified from the coated surface 10. In various embodiments, the color may be removed, reduced, or otherwise altered, by UV breakdown of the indicator 16, heating the indicator 16, chemically altering the indicator 16, and/or leaching the indicator 16 from the coating 14. That is, in a particular embodiment, the indicator 16 is controllable to "demodify" or otherwise revert the appearance of the coated surface 10 to an essentially uncolored state. In a specific example, the colorant AA225 is removed from the coating 14 by soaking the coated surface 10 in water for 24 hours. In another example, Methyl Blue is controlled to change to a less visible color by altering the pH of the coating 14. It is an advantage of embodiments that coating an aluminum or titanium surface with the coating 14 containing Methyl Blue, induces such a change in the Methyl Blue colorant. Thus, by utilizing Methyl Blue as the indicator 16, a strong blue color is observed during application of the coating 14 which facilitates determining the thickness of the applied coating 14 and, thereafter, the indicator 16 is controlled to fade to a lighter color. By including Methyl Blue in the coating 14 at a concentration which results in a blue color that is at or near the limit of visibility, upon conversion of the indicator 16 to a less visible color, the indicator 16 is controlled to become effectively clear. In yet other examples, colorants that are unstable in light or UV light or are unstable when exposed to heat are utilized as the indicator 16 and appropriate conditions to render the indicator 16 colorless are applied to the coated surface 10.

At step 54, it is determined if the color has been sufficiently modified. For example, the user or operator may visually inspect the coated surface 10 to determine if color remains. In particular, depending upon the method of color modification, areas calling for increased diligence may include those areas susceptible to shadows, crevices, and the like. If it is determined that some color remains essentially unmodified, the coated surface 10 may be further modified at step 52.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A composition for coating a surface, the composition comprising:
    an alkoxyzirconium carrier; and
    a water soluble dye indicator distributed throughout the carrier and configured to modify an appearance of the coating, wherein the dye indicator facilitates determining a thickness of the coating in response to the appearance of the coating and wherein the dye indicator is controllable to demodify the appearance of the coating.

2. The composition according to claim 1, wherein the alkoxyzirconium carrier comprises:
    an alkoxyzirconium aqueous sol comprising $(R-O)_4-Zr$, wherein R is $C_2$-$C_5$ aliphatic, the zirconium being configured to chemically bond the surface;
    an organosilane coupling agent; and
    a catalyst comprising acetic acid.

3. The composition according to claim 1, wherein the dye indicator is configured to fluoresce at a visible wavelength in response to exposure to a wavelength of electromagnetic radiation.

4. The composition according to claim 1, wherein the dye indicator is configured to fade over time.

5. The composition according to claim 1, wherein the dye indicator is configured to diffuse out of the coating in response to exposing the coating to a solvent, wherein the solvent does not otherwise substantially alter the coating.

6. The composition according to claim 1, wherein the dye indicator is chemically tethered to a component of the carrier.

7. The composition according to claim 5, wherein the dye indicator is covalently bound to the component.

8. A composition for coating a surface, the composition comprising:
    a carrier comprising:
        an alkoxyzirconium aqueous sol comprising $(R-O)_4-Zr$, wherein R is $C_2$-$C_5$ aliphatic, the zirconium being configured to chemically bond the surface;
        an organosilane coupling agent; and
        a catalyst comprising acetic acid; and
    a water soluble dye distributed throughout the carrier, wherein the dye modifies an appearance of the coating.

9. The composition according to claim 8, wherein the dye is configured to fluoresce at a visible wavelength in response to exposure to a wavelength of electromagnetic radiation.

10. The composition according to claim 8, wherein the dye is configured to fade over time.

11. The composition according to claim 8, wherein the dye is configured to diffuse out of the coating in response to exposing the coating to a solvent, wherein the solvent does not otherwise substantially alter the coating.

12. The composition according to claim 8, wherein the dye is chemically tethered to a component of the carrier.

13. The composition according to claim 12, wherein the dye is covalently bound to the component.

* * * * *